US007562084B2

(12) United States Patent
Markel et al.

(10) Patent No.: US 7,562,084 B2
(45) Date of Patent: Jul. 14, 2009

(54) SYSTEM AND METHOD FOR MAPPING BETWEEN INSTRUMENTATION AND INFORMATION MODEL

(75) Inventors: Arieh Markel, Broomfield, CO (US); Alexander G. Vul, Palo Alto, CA (US); Peter H. Schow, Longmont, CO (US); Nicholas Mark Grant Stephen, St. Martin d'Uriage (FR)

(73) Assignee: Sun Microsystems, Inc., Santa Clara, CA (US)

( * ) Notice: Subject to any disclaimer, the term of this patent is extended or adjusted under 35 U.S.C. 154(b) by 266 days.

(21) Appl. No.: 11/473,197

(22) Filed: Jun. 22, 2006

(65) Prior Publication Data
US 2007/0299848 A1    Dec. 27, 2007

(51) Int. Cl.
*G06F 7/00* (2006.01)
(52) U.S. Cl. .................. 707/100; 707/10; 707/102; 707/103 R; 707/200; 707/204
(58) Field of Classification Search ........... None
See application file for complete search history.

(56) References Cited

U.S. PATENT DOCUMENTS 6,167,405 A * 12/2000 Rosensteel et al. ......... 707/102
6,999,956 B2   2/2006 Mullins
7,290,244 B2 10/2007 Peck et al.
2002/0091702 A1 * 7/2002 Mullins .................. 707/100
2003/0023518 A1   1/2003 Spriggs et al.
2003/0163298 A1   8/2003 Odom et al.
2004/0044793 A1 * 3/2004 Pauly et al. ............... 709/246
2005/0165881 A1 * 7/2005 Brooks et al. ............. 709/200
2006/0236225 A1 10/2006 Achilles et al.
2007/0055643 A1   3/2007 Iwatsu et al.

OTHER PUBLICATIONS

"CIM Tutorial"; Distributed Management Task Force, Inc. and WBEM Solutions, Inc.; www.wbernsolutions.com/tuitorials/CIM/; 2003; (105 pages).

* cited by examiner

*Primary Examiner*—Don Wong
*Assistant Examiner*—Andalib F Lodhi
(74) *Attorney, Agent, or Firm*—Osha • Liang LLP

(57) ABSTRACT

A method for managing an asset that includes acquiring an information model request for managing the asset, wherein the information model request is in an information model format, identifying a name and a type of an attribute from the information model request, obtaining a mapping specification entry matching the name and the type of the attribute, translating the information model request from the information model format to a data acquisition (DAQ) format based on the mapping specification entry to create a translated request, managing the asset according to the translated request to obtain management information, and transmitting the management information to an information model.

20 Claims, 7 Drawing Sheets

SYSTEM AND METHOD FOR MAPPING BETWEEN INSTRUMENTATION AND INFORMATION MODEL

CROSS-REFERENCE TO RELATED APPLICATIONS

The present application contains subject matter that may be related to the subject matter in the following U.S. patent applications, which are all assigned to a common assignee: "System and Method for Meta-data Driven Instrumentation" U.S. patent application Ser. No. 11/472,614, filed on Jun. 22, 2006; "System and Method for Meta-data Driven Instrumentation" U.S. patent application Ser. No. 11/472,928, filed on Jun. 22, 2006; "Resource Discovery and Enumeration in the Meta-Data Driven Instrumentation" U.S. patent application Ser. No. 11/473,098, filed on Jun. 22, 2006; "System and Method for Object-Oriented Meta-Data Driven instrumentation" U.S. patent application Ser. No. 11/473,099, filed on Jun. 22, 2006; "System and Method for Native-Asset-Interface Libraries for Instrumentation" U.S. patent application Ser. No. 11/472,852, filed on Jun. 22, 2006; "Asynchronous Events in Meta-Data Driven Instrumentation" U.S. patent application Ser. No. 11/473,100, filed on Jun. 22, 2006; and "System and Method for Efficient Meta-Data Driven Instrumentation" U.S. patent application Ser. No. 11/472,660, filed on Jun. 22, 2006.

BACKGROUND

A network corresponds to an interconnection of more than one computer system. For example, one type of network is a home network. A home network may correspond to two or more personal computers that can exchange data with each other and the Internet. Different types of networks exist throughout society. For example, large organizations often have data centers, servers, and various personal computer systems to exchange information between users, and to provide processing power to a single user.

In order to provide such functionality, a network includes various types of hardware and software. For example, the hardware includes the computer systems (personal computers, servers, and other such computing devices), network interface hardware, interconnection mediums (e.g., cables, wireless signals, etc.) routers, switches, hubs, and other such hardware. The software is instructions for providing the functionality of the network. For example, the software may include operating systems, network specific applications, user applications, server applications, etc.

In order to keep a network operating properly, the network must be managed. Managing a network involves managing the different resources (i.e., hardware and software) of the network. Typically, a resource can be managed through an application programming interface (API) of the resource. An application programming interface is the interface that a resource provides in order to allow management requests for service and management data to be made of the resource by management applications. Specifically, a management application that has knowledge of the application programming interface of the resource can manage the resource by accessing the different functions and data available through the application programming interface of the resource.

SUMMARY

In general, in one aspect, the invention relates to a method for managing an asset that includes acquiring an information model request for managing the asset, wherein the information model request is in an information model format, identifying a name and a type of an attribute from the information model request, obtaining a mapping specification entry matching the name and the type of the attribute, translating the information model request from the information model format to a data acquisition (DAQ) format based on the mapping specification entry to create a translated request, managing the asset according to the translated request to obtain management information, and transmitting the management information to an information model.

In general, in one aspect, the invention relates to a system for managing an asset that includes an information model for acquiring an information model request for managing the asset, wherein the information model request is in an information model format, and identifying a name and a type of an attribute from the information model request, and an information model mapping specification for obtaining a mapping specification entry matching the name and the type of the attribute, and translating the information model request from the information model format to a data acquisition (DAQ) format based on mapping specification entry to create a translated request, wherein the asset is managed according to the translated request to obtain management information, and wherein the management information is transmitted to the information model.

In general, in one aspect, the invention relates to a distributed computer system having a plurality of nodes for performing a method that includes acquiring an information model request for managing the asset, wherein the information model request is in an information model format, identifying a name and a type of an attribute from the information model request, obtaining a mapping specification entry matching the name and the type of the attribute, translating the information model request from the information model format to a DAQ format based on the mapping specification entry to create a translated request, managing the asset according to the translated request to obtain management information, and transmitting the management information to an information model, wherein obtaining the mapping specification entry and managing the asset is performed on at least one of the plurality of nodes.

Other aspects of the invention will be apparent from the following description and the appended claims.

DETAILED DESCRIPTION

Figure 1:
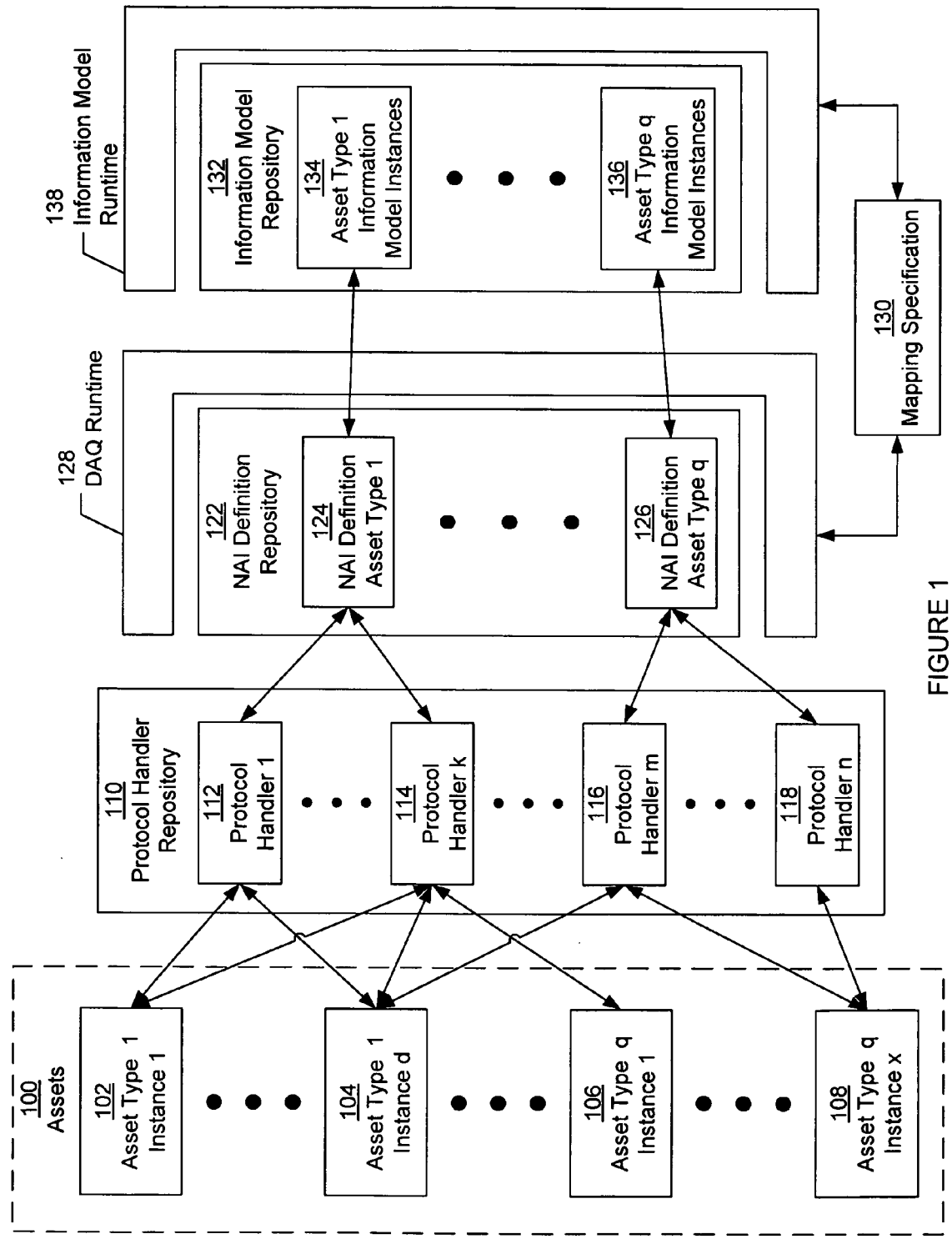
FIG. 1 shows a schematic diagram of a system for managing assets in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for managing assets. Specifically, embodiments of the invention provide a mechanism for managing assets of different asset types through a common interface. Managing an asset includes monitoring the asset, actively managing the asset, registering the asset, or performing any other function on the asset. Further, embodiments of the invention use a mapping specification in order for the information model that performs the management to not know the application programming interface (API) of the asset being managed.

FIG. 1 shows a schematic diagram of a system for managing assets in accordance with one or more embodiments of the invention. As shown in FIG. 1, the system includes assets (100), a protocol handler repository (110), a native asset interface (NAI) definition repository (122), a data acquisition (DAQ) runtime (128), an information model repository (132), an information model runtime (138), and a mapping specification (130) in accordance with one or more embodiments of the invention. Each of these components is described below.

An asset (100) corresponds to any type of actual manageable resource in accordance with one or more embodiments of the invention. Specifically, asset (100) corresponds to the resources that are the object of the management. For example, an asset may correspond to software (e.g., operating system, database application, network application, or any other type of software) or hardware (e.g., computer systems, routers, switches, etc.).

One attribute of an asset (100) corresponds to the asset type. An asset type specifies a group of characteristics of the asset. The asset type may specify a type of operating system, a type of hardware, a type of server, etc. For example, if the asset is an operating system, then the asset type for the asset may correspond to a particular operating system, such as Solaris™ developed by Sun Microsystems, Inc. (a trademark of Sun Microsystems, Inc. located in Santa Clara). In one or more embodiments of the invention, assets that have the attribute of the same asset type have the same native asset interface (NAI) for managing the resources of the asset.

An NAI corresponds to a collection of instrumentation and control interfaces that is provided by the asset for the purposes of managing the asset. For example, an NAI may correspond to command line programs, files, simple network management protocol (SNMP), Intelligent Platform Management Interface (IPMI), etc.

An asset type may have one or more instances (e.g., asset type l/instance l (102), asset type l/instance d (104), asset type q/instance 1 (106), asset type q/instance x (108)) of the asset type. In particular, assets that are of the same asset type are called instances of the asset type. For example, as shown in FIG. 1, asset type l has at least two instances (e.g., asset type l/instance 1 (102) and asset type l/instance d (104)), while asset type q has at least two separate instances (e.g., asset type q/instance 1 (106) and asset type q/instance x (108)).

Continuing with FIG. 1, the system also includes a protocol handler repository (110) in accordance with one or more embodiments of the invention. A protocol hander repository (110) corresponds to a storage unit, such as a file system or library, for protocol handlers (e.g., protocol handler l (112), protocol handler k (114), protocol handler m (116), protocol handler n (118)). A protocol handler (e.g., protocol handler l (112), protocol handler k (114), protocol handler m (116), protocol handler n (118)) corresponds to a logical component that includes functionality to directly access the data, methods, and functions of an asset (100). Specifically, the protocol handler (e.g., protocol handler l (112), protocol handler k (114), protocol handler l (116), protocol handler n (118) includes functionality to use the NAI of the asset in order to manage the asset.

In one or more embodiments of the invention, each protocol handler (e.g., protocol handler l (112), protocol handler k (114), protocol handler m (116), protocol handler n (118)) is designed for a single protocol or NAI. For example, one protocol handler (e.g., protocol handler l (112), protocol handler k (114), protocol handler m (116), protocol handler n (118)) may include functionality to manage assets that use the SNMP, another protocol handler may be designed for IPMI, while another protocol handler may be designed for assets that are managed through Integrated Light Out Management (ILOM) developed by Sun Microsystems, Inc. and another protocol handler may manage assets that use the Network Time Protocol (NTP). In one or more embodiments of the invention, only one protocol handler exists for any single protocol. Those skilled in the art will appreciate that multiple protocol handlers may exist for any single protocol for redundancy purposes.

Because the protocol handlers are associated with a single protocol, each protocol handler (e.g., protocol handler l (112), protocol handler k (114), protocol handler m (116), protocol handler n (118)) is connected to one or more asset instance (e.g., asset type l/instance 1 (102), asset type l/instance d (104), asset type q/instance 1 (106), asset type q/instance x (108)) in accordance with one or more embodiments of the invention. Specifically, assets (100) that have at least one common NAI are connected to the same protocol handler regardless of whether the assets are of the same asset type.

Similarly, each asset instance (e.g., asset type l/instance 1 (102), asset type l/instance d (104), asset type q/instance 1 (106), asset type q/instance x (108)) is connected to one or more protocol handlers (e.g., protocol handler l (112), protocol handler k (114), protocol handler m (116), protocol handler n (118)) in accordance with one or more embodiments of the invention. Specifically, each asset instance (e.g., asset type l/instance 1 (102), asset type l/instance d (104), asset type q/instance 1 (106), asset type q/instance x (108)) may be accessed by one or more protocol handlers (e.g., protocol handler l (112), protocol handler k (114), protocol handler m (116), protocol handler n (118)) that correspond to the protocols for managing the asset.

In addition to the protocol handler repository (110), the system includes a NAI definition repository (122). A NAI definition repository (122) corresponds to a storage unit, such as a library or file system, for NAI definitions (e.g., NAI definition asset type l (124), NAI asset type q (126)). An NAI definition (e.g., NAI definition asset type l (124), NAI asset type q (126)) corresponds to an abstraction of the management components of an asset in accordance with one or more embodiments of the invention. Specifically, an NAI definition stipulates how data acquisition is performed and how data is populated for access. Moreover, an NAI definition (e.g., NAI definition asset type l (124), NAI asset type q (126)) provides a common interface for defining the manageable components of the different assets. In one or more embodiments of the invention, each asset type has a single NAI definition (e.g., NAI definition asset type 1 (124), NAI asset type q (126)). Accordingly, the same NAI asset type definition may be used for multiple asset instances of the same asset type.

A data acquisition (DAQ) runtime (128) corresponds to a logical component that includes functionality to use a runtime binding of the NAI definition to manage the asset. Moreover, in one or more embodiments of the invention, the DAQ runtime (128) corresponds to the main focus of the system. Specifically, the DAQ runtime includes functionality to operate on NAI definitions (e.g., NAI definition asset type 1 (124), NAI asset type q (126)). The DAQ runtime (128), and the NAI definitions (e.g., NAI definition asset type l (124), NAI asset type q (126)) are described in more detail in FIG. 3.

Continuing with FIG. 1, the NAI definitions (e.g., NAI definition asset type 1 (124), NAI asset type q (126)) are connected to an information model that includes the information model repository (132) and the information model runtime (138). An information model corresponds to a public interface for assets (100). The information model repository (132) corresponds to a storage unit for information model instances (e.g., asset type l information model instances (134), asset type q information model instances (136)). The information model instances (e.g., asset type 1 information model instances (134), asset type q information model instances (136)) are described in more detail in FIG. 2.

Continuing with the information model repository (132) of FIG. 1, the information model runtime (138) includes functionality to provide an execution environment for the information model repository (132). Specifically, the information model runtime (138) corresponds to the classes and methods of the information model during execution.

A mapping specification (130) is interposed between the information model runtime (138) and the DAQ runtime (128) in accordance with one or more embodiments of the invention. The mapping specification (130) includes functionality to translate requests between the information model runtime (138) and the DAQ runtime (128). In particular, the mapping specification (130) provides a mechanism for transforming requests for properties, methods, or events from the information model to the DAQ. In on or more embodiments of the invention, transforming the requests include performing a type conversion, naming conversion, performing the correct routing between components, etc. The mapping specification is described in detail in FIG. 4 in accordance with one or more embodiments of the invention.

Figure 2:
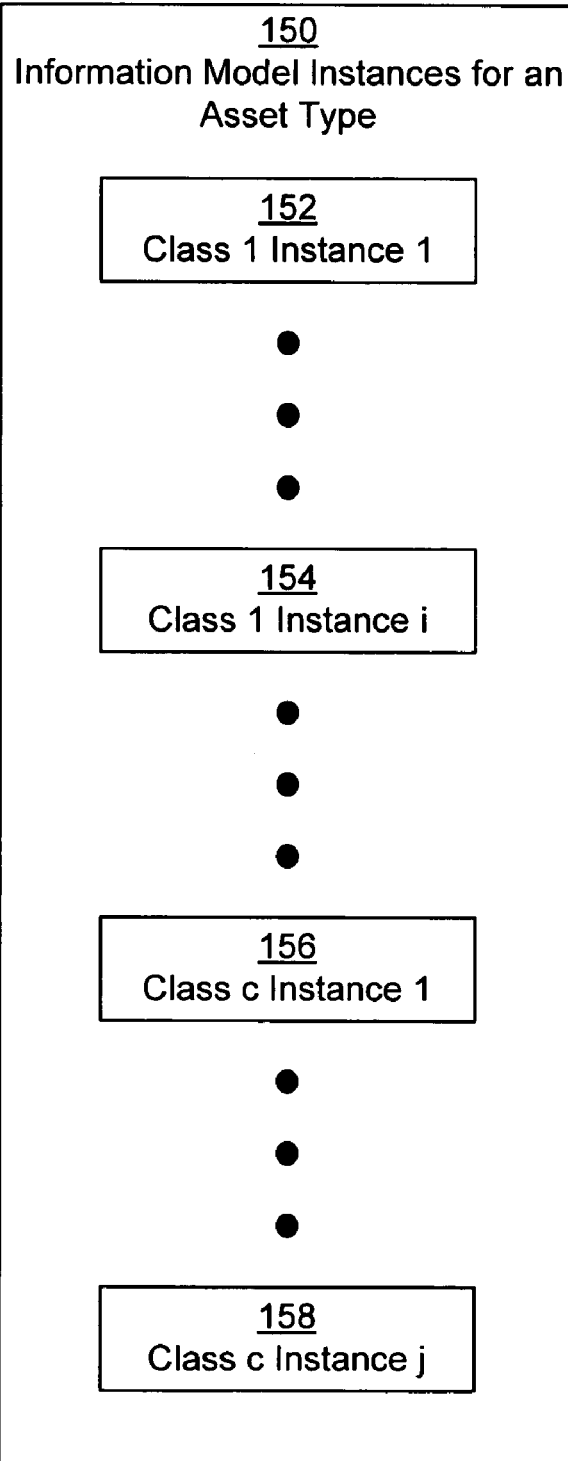
FIG. 2 shows a schematic diagram of information model instances for an asset type in accordance with one or more embodiments of the invention.

Returning to the information model, FIG. 2 shows a schematic diagram of information model instances for an asset type (150) in accordance with one or more embodiments of the invention. As shown in FIG. 2, each information model for an asset type includes multiple classes. A class corresponds to a collection of methods and properties that are common to a particular kind of component of the asset type. The method corresponds to the methods that can be used for managing an asset. The properties correspond to the manageable variables of an asset. For example, if the asset type is a particular type of server, a class may correspond to properties and methods for managing the operating system component for the particular type of server.

Each class includes multiple class instances (e.g., class l/instance 1 (152), class l/instance i (154), class c/instance 1 (156), class c/instance j (158)) in accordance with one or more embodiments of the invention. A class instance (e.g., class l/instance 1 (152), class l/instance i (154), class c/instance 1 (156), class c/instance j (158)) corresponds to an abstraction of an asset type instance in information model format. In one or more embodiments of the invention, the information model format corresponds to common information model (CIM) format (developed by Distributed Management Task Force, Inc. located in Portland, Oreg.). As shown in FIG. 2, the class instances (e.g., class l/instance l (152), class l/instance i (154), class c/instance 1 (156), class c/instance j (158)) for the information model may not be in a one to one relationship with the instances of the asset type for the class. In particular, some asset type instances may not have a corresponding instance for a particular information model class.

Each information model class instance (e.g., class l/instance l (152), class l/instance i (154), class c/instance l (156), class c/instance j (158)) is connected to a mapping specification (not shown) in accordance with one or more embodiments of the invention. The mapping specification includes functionality to map between the information model format and the DAQ format of the DAQ runtime. Accordingly, an information model class instance (e.g., class l/instance 1 (152), class l/instance i (154), class c/instance 1 (156), class c/instance j (158)) can manage virtually any asset without knowledge of the specific protocols used to manage the asset.

Alternatively, in one or more embodiments of the invention, each information model class instance (e.g., class l/instance l (152), class l/instance i (154), class c/instance l (156), class c/instance j (158)) may include the information required to format communication in the DAQ format in order to directly communicate with the DAQ runtime in accordance with one or more embodiments of the invention.

Figure 3:
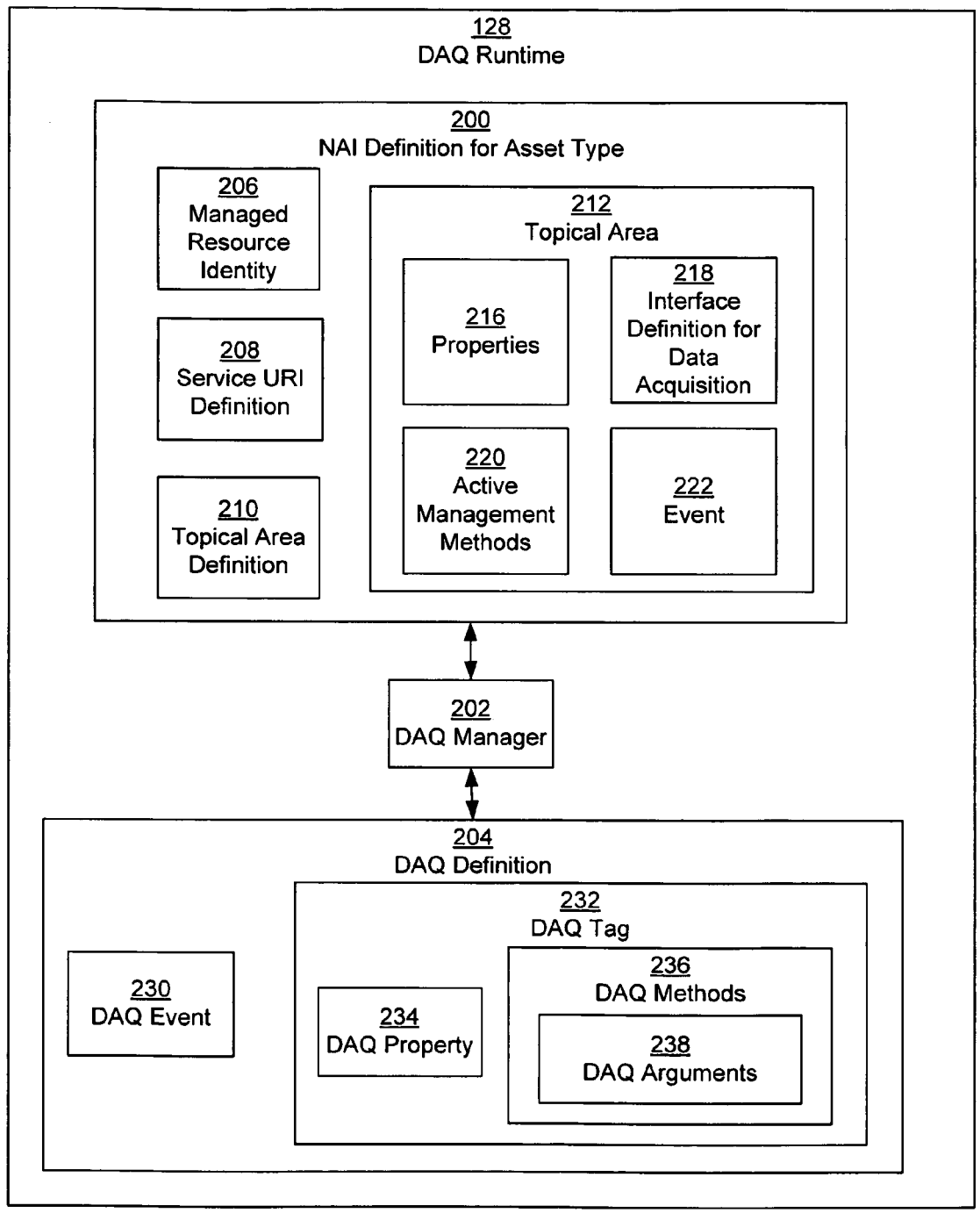
FIG. 3 shows a schematic diagram of a data acquisition runtime used for managing assets in accordance with one or more embodiments of the invention.

FIG. 3 shows a schematic diagram of a DAQ runtime (128) used for managing assets in accordance with one or more embodiments of the invention. As shown in FIG. 3, the DAQ runtime (128) includes an NAI definition for the asset type (200), a DAQ manager (202) and a DAQ definition (204) in accordance with one or more embodiments of the invention. Each of these components is described below.

An NAI definition for an asset type (200) corresponds to a description of the NAI for the asset. Specifically, for each manageable component of the asset type, the NAI definition defines how to manage the component using the NAI of the component. In one or more embodiments of the invention, the NAI definition includes a scheme or protocol (e.g., SNMP, IPMI, etc.), and a part that defines how to execute the NAI in context of the protocol. For example, suppose that information about a computer system are gathered by a command line command "uname-a." Then the NAI definition may specify that the protocol is a shell, the location of the computer system, and the command "uname-a."

In one or more embodiments of the invention, the NAI definition for the asset type (200) is defined using extensible markup language (XML). Specifically, the aforementioned components of the NAI definition are denoted by XML tags. Moreover, in one or more embodiments of the invention, the NAI definition complies with a predefined XML schema. The NAI definition for the asset type (200) includes a managed resource identity (206), a service URI definition (208), a topical area definition (210), and a topical area (212). Each of these components is described below.

The managed resource identity (206) corresponds to a definition of the asset type. Specifically, the managed resource identity (206) uniquely identifies the asset type in the NAI repository (not shown). In one or more embodiments of the invention, the managed resource identity (206) corresponds to an alphanumeric identifier.

In addition to the managed resource identity (206), the NAI definition for the asset type (200) includes a service URI definition (208). The service URI definition (208) denotes how instances of the asset are enumerated. Specifically, the service URI definition (208) defines the scheme and method for identifying all instances of the asset type. For example, the service URI definition (208) may specify an enumeration service, a database, a discovery protocol, or any other mechanism for enumerating instances of an asset type.

The NAI definition for the asset type (200) also includes a topical area definition (210) in accordance with one or more embodiments of the invention. A topical area definition (210) identifies the different topical areas that can be managed for an asset type. For example, if the asset type is a computer system, then the topical area definition (210) may specify that the different manageable components of the asset type or topical areas of the asset type. For example, the topical areas may correspond to operating system, storage, networking, executing processes, or other such area.

In accordance with one or more embodiments of the invention, each topical area includes a topical area definition (212). The topical area definition (212) corresponds to a specification for managing the topical area. The topical area definition (212) includes properties (216), interface definitions for data acquisition (218), active management methods (220), and events (222). Each of these components is described below.

Properties (216) correspond to the information in the topical area about the asset type. Specifically, a property (216) corresponds to the information and data that can be set and obtained from an asset. For example, if the topical area corresponds to storage, then the properties may correspond to storage space, partitioning, amount of used space, etc. In one or more embodiments of the invention, the name of a property is unique within the namespace of the topical area. Further, in one or more embodiments of the invention, each property (216) includes a plurality of attributes. For example, the attributes of the property (216) may correspond to the name, a description, whether the property is able to be changed, the data type of values of the property, etc.

The interface definition for data acquisition (218) identifies how the properties (216) are populated in accordance with one or more embodiments of the invention. Specifically, the interface definition for data acquisition (218) specifies the scheme and method in the context of the scheme that is used to manage the asset in relation to the property. For example, the interface definition for data acquisition may correspond to snmp://target@host:port/1.3.6.2.1.1.1.*. The SNMP portion shows the scheme that is used to obtain a property as required by the NAI for the property is SNMP. The remainder portion of the example interface definition corresponds to the location for obtaining and setting the property on the asset.

Continuing with FIG. 3, the topical area definition (212) also includes active management methods (220). The active management methods (220) correspond to information about the methods that the NAI for the asset type provides in order to manage the asset by modification. For example, a method from the NAI may correspond to reset a particular value. The active management methods (220) identify how the value is reset. In one or more embodiment of the invention, active management methods (220) provide information for invoking the method for the NAI of the asset type.

Another component of the topical area definition (212) is an event (222). An event (222) corresponds to information for subscribing for notifications. Specifically, the NAI for the asset type generally includes mechanisms for receiving periodic notifications or only notification of changes. An event (222) corresponds to the definition of how to turn on the NAI for the notifications. For example, an event (222) may correspond to information about how to register for information about temperature.

In addition to the NAI definition for the asset type (200), the DAQ runtime (128) includes a DAQ definition (204) in accordance with one or more embodiments of the invention. A DAQ definition (204) corresponds to a runtime image of the NAI definition for the asset type (200). Specifically, the DAQ definition (204) corresponds to a runtime binding of the NAI definition for the asset type (200). For example, whereas in one or more embodiments of the invention, the NAI definition for the asset type (200) is in XML language, the DAQ definition (204) may correspond to an object oriented programming language. More specifically, a binding compiler (not shown) includes functionality to translate XML schema into one or more Java™ classes without requiring the developer to write complex parsing code. Moreover, in one or more embodiments of the invention, each DAQ definition (204) has the same names for the methods regardless of the different NAI definitions. Accordingly, the DAQ definition provides a common interface for each of the different asset types of the NAI definitions.

In one or more embodiments of the invention, the DAQ definition (204) includes a DAQ event (230) and a DAQ tag (232). A DAQ event (230) corresponds to a runtime binding of an event (222). Specifically, a DAQ event (230) includes functionality to compare an old value and new value for a property corresponding to the DAQ event (230). Further, the DAQ event includes functionality to register listeners for the DAQ event (230) and inform registered listeners of a current status (e.g., changes between the old and new value, no change, etc.) of the property associated with the DAQ event (230).

A DAQ tag (232) corresponds to a runtime image of the topical area definition (212). Accordingly, those skilled in the art will appreciate that a DAQ tag (232) exists for each topical area definition (212) in accordance with one or more embodiments of the invention. The DAQ tag (232) includes a DAQ property (234) and DAQ methods (236).

A DAQ property (234) corresponds to a runtime image of the properties definition (216). Similarly, DAQ methods (236) correspond to a runtime image of the active management methods (220). The DAQ methods (236) include DAQ arguments (238). The DAQ arguments (238) correspond to the arguments required by the NAI methods of the asset. For example, if the NAI method for an asset corresponding to storage is to change the partitioning of the storage, then the DAQ arguments for a DAQ method of partitioning may specify how the storage devised is partitioned.

Interposed between the DAQ definition (204) and the NAI definition for an asset type (200) is a DAQ manager (202). The DAQ manager (202) corresponds to a logical engine that includes functionality to perform a runtime binding of the NAI definition for the asset type (200) with the DAQ definition (204) in accordance with one or more embodiments of the invention. Further, the DAQ manager (202) includes functionality to identify the DAQ definition (204) for a given management request and trigger the operations required using the DAQ definition (204) for managing the asset according to the management request.

For example, in one exemplary implementation of one or more embodiments of the invention, the DAQ runtime includes functionality to process request of type "get attributes", "set attributes", "invoke methods", and "manage event subscription" requests. The DAQ runtime processing of the requests in the exemplary implementation is described below.

In one or more embodiments of the invention, in response to a "get attribute" request the runtime includes functionality to perform the following. Specifically, in response to the "get attribute" request, the runtime includes functionality to determine the DAQ tag where the attribute of interest is located by accessing the DAQ definition associated with the asset. The DAQ definition can be located via the assets NAI specification document, which is bound at execution time into the DAQ definition object. Next, the runtime includes functionality to obtain from the DAQ definition object the URI associated with the DAQ tag in accordance with one or more embodiments of the invention. Specifically, the DAQ tag includes the URI definition for the obtaining value of the attribute from the NAI of the asset in accordance with one or more embodiments of the invention. After obtaining the necessary information for identifying the NAI for the asset, the runtime includes functionality to query the protocol handler repository to obtain the protocol handler that corresponds to the URI associated with the DAQ tag in accordance with one or more embodiments of the invention. Finally, the runtime includes functionality to perform an invocation of the protocol handler to obtain the value of the required attribute.

Continuing with the example, in one or more embodiments of the invention, in response to a "set attribute" request the runtime includes functionality to perform the following. Specifically, in response to the "set attribute" request, the DAQ runtime includes functionality to determine the location of the DAQ tag for setting the attribute of interest. Determining the location may be performed by accessing the DAQ definition object associated with the asset in accordance with one or more embodiments of the invention. Next, the DAQ runtime includes functionality to obtain the URI associated with the DAQ tag from the DAQ definition object for the attribute in accordance with one or more embodiments of the invention. After obtaining the necessary information to set the attribute, the DAQ runtime includes functionality to query the protocol handler repository to obtain the protocol handler that corresponds to the URI associated with the DAQ tag in accordance with one or more embodiments of the invention. Finally, the DAQ runtime performs invocations of the protocol handler found in the library to set the attribute with the requested value.

Continuing with the example, in one or more embodiments of the invention, in response to an "invoke method" request the runtime includes functionality to perform the following. Specifically, in response to the "invoke method" request, the DAQ runtime includes functionality to determine the DAQ tag where the method of interest is located by accessing the DAQ definition associated with the asset. After determining the DAQ tag, the DAQ runtime includes functionality to obtain the URI associated with the method to be invoked from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a method invocation operation on the protocol handler that executes the API for the method to be invoked.

Lastly in the example implementation, when the DAQ runtime receives an event subscription request, the DAQ runtime includes functionality to determine the DAQ tag for the subscription event of interest is located by accessing the DAQ definition associated with the asset. After determining the DAQ tag, the DAQ runtime includes functionality to obtain the URI associated with the DAQ tag from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a subscription request operation using the protocol handler to obtain notification of events through the NAI of the asset.

As shown in the above example, the common interface through the DAQ allows for an information model to perform virtually any management functions on the asset that are exposed through the NAI of the asset without having the NAI of the asset in accordance with one or more embodiments of the invention. Specifically, using the aforementioned requests, virtually any management operation can be performed in accordance with one or more embodiments of the invention.

Figure 4:
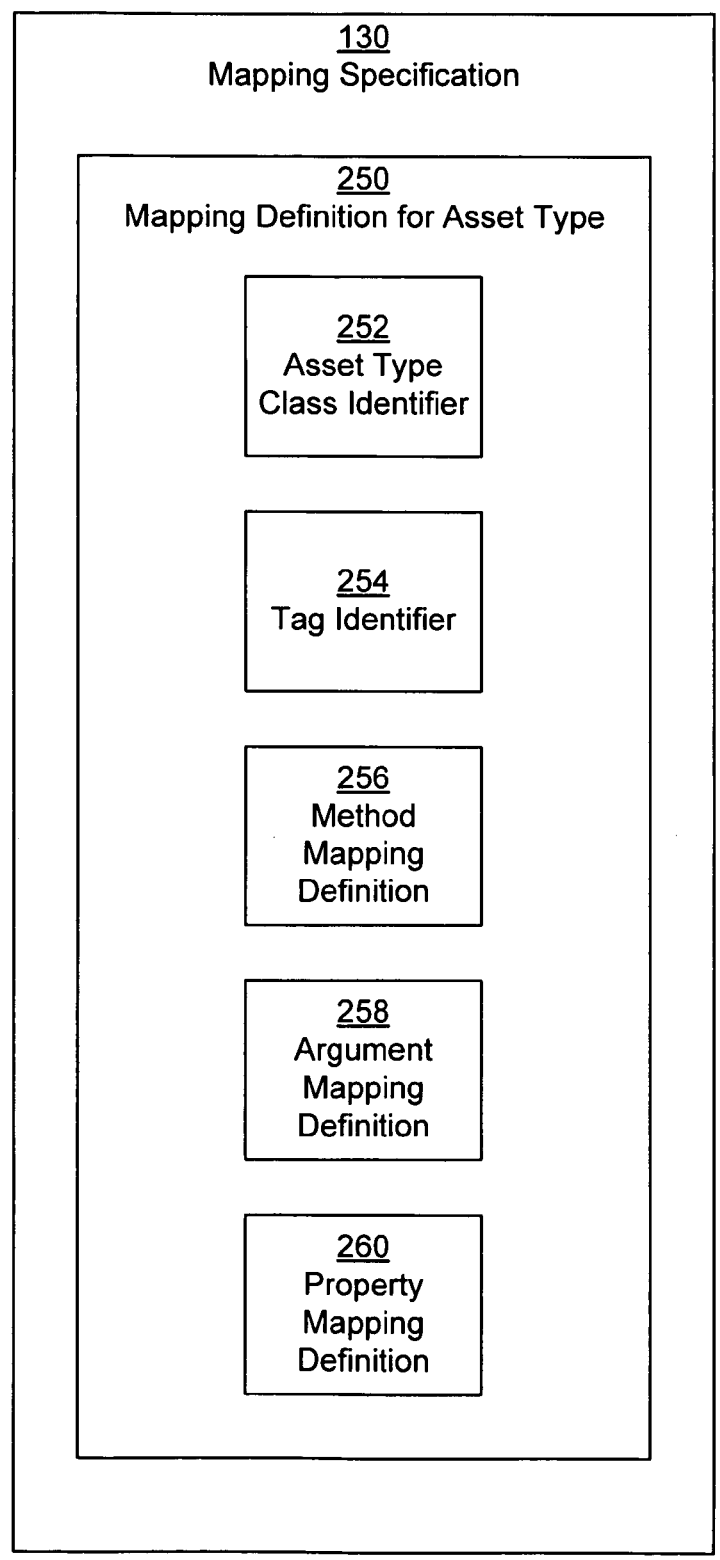
FIG. 4 shows a schematic diagram of a mapping specification used for managing assets in accordance with one or more embodiments of the invention.

In order to perform the management operations, a mapping specification is defined and used. FIG. 4 shows a schematic diagram of a mapping specification used for managing assets in accordance with one or more embodiments of the invention. As shown in FIG. 4, the mapping specification (130) includes a mapping definition for an asset type (250). Specifically, in accordance with one or more embodiments of the invention, each asset type that is defined in the DAQ runtime has a corresponding definition in the mapping specification (130).

In one or more embodiments of the invention, the mapping definition for an asset type (250) is defined in XML. Accordingly, the mapping definition for an asset type (250) may comply with an XML schema. Specifically, key indicators embedded in the XML schema may be used to specify the name of the information model class and the corresponding name of the DAQ for the different components of the mapping definition for an asset type (250) Those skilled in the art will appreciate that other languages or computer structures that provide for mapping between components may also be used. Further, mapping definitions may be dispersed or grouped when installed in a file system, into compressed files, or on a network device and specified by a URI.

In one or more embodiments of the invention, a mapping definition for an asset type includes an asset type class identifier (252), a tag identifier (254), a method mapping definition (256), an argument mapping definition (258), and a property mapping definition (260). Each of these components is described below.

An asset type class identifier (252) corresponds to identification, such as a name, for an information model class (described above). Similarly, a tag identifier (254) corresponds to the identification of a DAQ tag in the DAQ runtime. The asset type class identifier (252) and the tag identifier (254) provide a link between at least one information model class and the corresponding DAQ tag.

A method mapping definition (256) specifies how methods in the information model map to DAQ methods. In one or more embodiments of the invention, the method mapping definition identifies the method name of the information model method and the method name of the corresponding DAQ method. Specifically, the method mapping definition may specify how to access (e.g., format for a method call) the DAQ method and/or the information model method.

Further, in one or more embodiments of the invention, the method mapping definition may be associated with at least one argument mapping definition (258). Specifically, for each argument required by the method being mapped, an argument mapping definition (258) may exist. Those skilled in the art will appreciate that a single argument mapping definition may be defined for multiple method definitions or used for only one method definition. In addition, those skilled in the art will appreciate that certain method mapping definitions may not be associated with any argument mapping definitions.

An argument mapping definition (258) specifies how to map arguments in the information model class with arguments in the DAQ definition in accordance with one or more embodiments of the invention. Further, the argument mapping definition (258) may also include information for performing a transformation on the arguments. For example, in the process of mapping, a type conversion may be required. Thus, in the example, the argument mapping definition may define the different type requirements for the information model class and the DAQ definition.

A property mapping definition (260) corresponds to a mapping between properties in the DAQ definition to properties in the information model. In one or more embodiments of the invention, the property mapping definition (260) may also include information for performing a transformation between the information model class and the DAQ definition. The information may be directly defined within the mapping definition for the asset type (250), specified in a resource identified (e.g., in a URI) embedded in the property mapping definition (260), etc.

Figure 5:
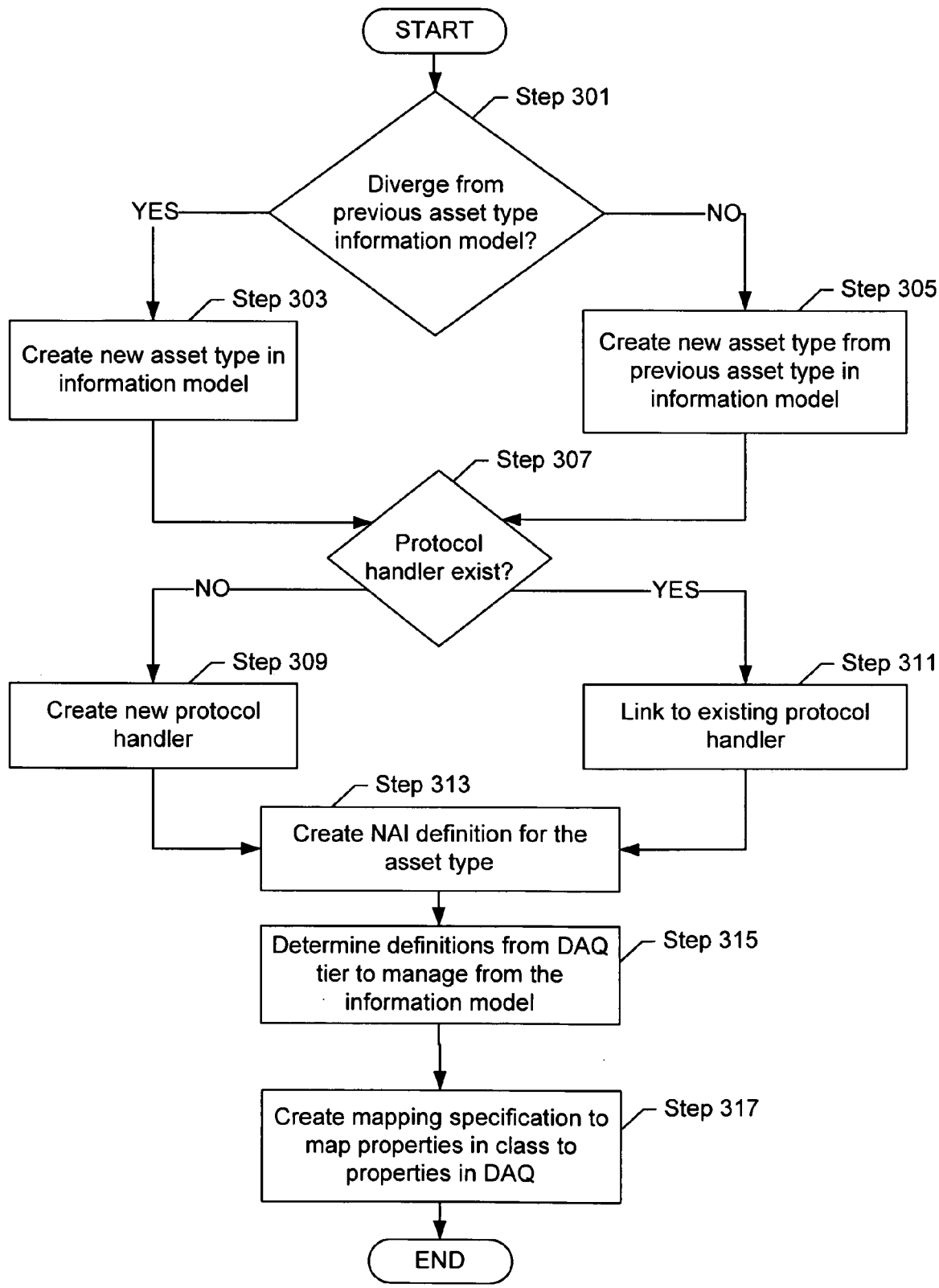
FIG. 5 shows a flowchart of a method for adding a new asset type to the system in accordance with one or more embodiments of the invention.

Using the mapping specification, the DAQ runtime, the DAQ manager, new assets can be easily added to the system regardless of whether the new assets correspond to a preexisting asset type. If the new asset is of a preexisting asset type, then a new instance of the information model classes for the asset are created and information about the new asset instance is added to the DAQ. Alternatively, if the new asset is of a new asset type, then the system is configured to include the new asset type. FIG. 5 shows a flowchart of a method for adding a new asset type to the system in accordance with one or more embodiments of the invention.

Initially, a determination is made whether the new asset type diverges from a previous asset type in the information model (Step 301). A new asset type diverges from a previous asset type if the components of the new asset type (e.g., operating system, hardware, networking, etc.) are different than any existing asset type already defined in the information model in accordance with one or more embodiments of the invention. Determining whether a new asset diverges from a previously existing asset type can be performed by identifying the components of the new asset and comparing the components with the assets already in the information model.

If the new asset diverges from a previous asset type in the information model, then a new asset type is created in the information model (Step 303). Specifically, new classes are developed for managing the new asset of the new asset type.

Alternatively, if the new asset does not diverge from a previously existing asset, then a new asset type can be created from a previously existing asset type in the information model (Step 305). Specifically, any preexisting classes in the information model that can be used as a basis for the new asset type may be copied or inherited into the new classes.

After creating the new asset type, an instance of the newly developed classes is instantiated in the information model (not shown).

Continuing with FIG. 5, protocol handlers are also associated with the new asset. Specifically, a determination is made whether the protocol handlers exist for the new asset type (Step 307). Determining whether protocol handlers exist for the new asset can be performed by identifying the NAI of the asset type. Specifically, as part of the information about the asset of the new asset type or the configuration of the asset, the NAI, or interface for managing the asset type is revealed. The NAI specifies the protocols or schemes that are required for managing the asset type. Based on the specified protocols or schemes, a protocol handler can be identified.

If a protocol handler does not exist for the new asset, then a new protocol handler is created (Step 309). Specifically, at this stage, a new protocol handler is developed for the new asset. Developing the protocol handler may include creating any classes or functions for the protocol handler in a programming language in accordance with one or more embodiments of the invention.

Alternatively, if a protocol handler already exists for the asset type, then a link to the protocol handler is created (Step 311). Specifically, the NAI definition in the DAQ runtime links to the protocol handler.

Accordingly, using the newly created protocol handler or a preexisting protocol handler, the NAI definition for the asset is created (Step 313). At this stage, the mechanisms for managing the manageable components of the asset are identified. Based on the manageable components, the NAI definition is developed. Specifically, for each mechanism for managing the asset, a definition is added to the NAI definition for the asset. More specifically, the tags are identified and the information within the tags is populated in accordance with one or more embodiments of the invention. At any stage after creating the NAI definition and before the asset is managed, the DAQ manager may perform the runtime binding of the NAI definition to the DAQ definition. Performing the runtime binding may include, for example, parsing the NAI definition and creating a DAQ definition object for managing the asset using the information in the NAI definition.

In order to manage the asset of the new asset type, the information model instance must be linked to the DAQ definition. Accordingly, the definitions from the DAQ tier to manage from the information model are determined (Step 315). Specifically, the DAQ tags, properties, methods, etc. and procedures for performing any required transformation are identified.

Using the identified procedures, a mapping specification is created to map the properties in the information model class to the properties in the DAQ (Step 317). Creating the mapping specification may include identifying how the components of the information model correlate to the components of the DAQ. The mapping specification may then be created to reflect the correlation between components. In one or more embodiments of the invention, existing definitions may be used to create the mapping specification. Specifically, a developer may inherit from previously existing definitions to create the mapping specification.

Once the mapping specification is created, instances of the information model are added, and the NAI definition is bound to the DAQ definition, the asset can be managed according to management requests.

Figure 6:
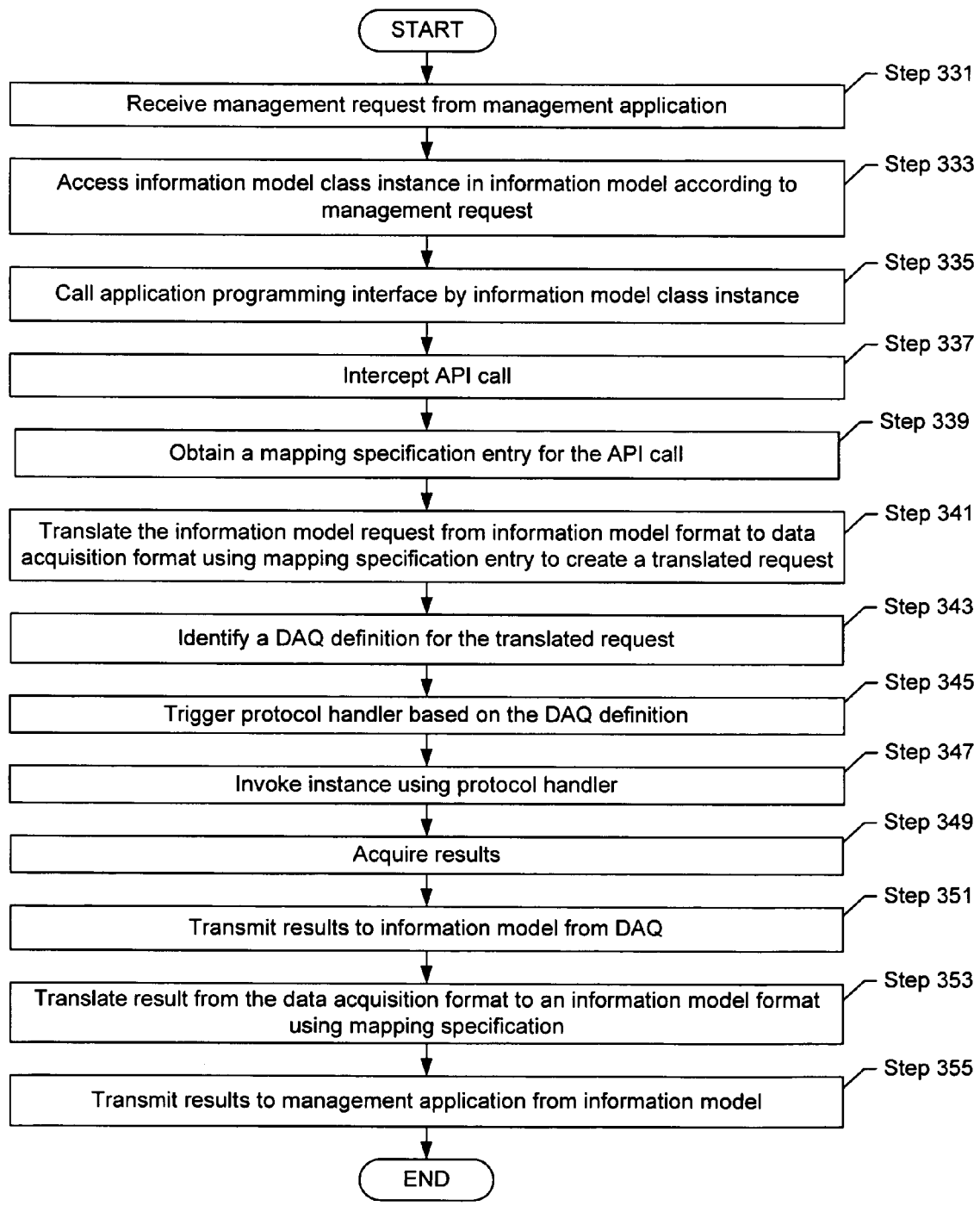
FIG. 6 shows a flowchart of a method for processing a management request in accordance with one or more embodiments of the invention.

FIG. 6 shows a flowchart of a method for processing a management request in accordance with one or more embodiments of the invention. Initially, a management request is received from a management application (Step 331). In one or more embodiments of the invention, the management request is received by the information model in information model format. More specifically, the management application submits a query to the information model using the API of the information model.

According to the management request, the information model class instance is accessed in the information model (Step 333). In particular, the management request may include one or more asset identifiers or an asset type identifier. Based on the identifiers and the type of request, information model asset type instance is identified and accessed. At this stage, the information model class instance may be triggered to perform the management function.

By accessing the information model class instance, an API is called from the information model class instance (Step 335). Specifically, the information model class instance includes a call to an API for managing the asset. The API may or may not have any resemblance to the NAI of the asset. In one or more embodiments of the invention, the call to the API is intercepted (Step 337).

After intercepting the API call, the mapping specification entry for the API call is obtained (Step 339). Obtaining the mapping specification entry may be performed, for example, by identifying the information model class instance that created the call. Based on the information model class instance, the mapping specification may be search for the mapping definition for the asset type. Also, at this stage, the actual mapping definition may be found based on the type of API call. For example, if the API corresponds to a method called "reset," then the mapping definition for the asset type may be searched for a method mapping definition that matches and information model "reset" method call. The method mapping definition may also contain the information about required argument mapping definition.

After obtaining the mapping specification entry for the API call, the information model request is translated from information model format to DAQ format using the mapping specification entry to create a translated request (Step 341) in accordance with one or more embodiments of the invention. Specifically, at this stage, each portion of the API call is translated by accessing the mapping specification entry and determining the associated DAQ definition. For example, if the request is for property access, then the obtained mapping specification entry corresponds to the property requested. Because, in the example, the mapping specification entry not only contains the corresponding DAQ property name, but also the transformation information for the DAQ definition in accordance with one or more embodiments of the invention, the request for property may be easily translated.

Next, the DAQ definition is identified for the translated request (Step 343). At this stage, the DAQ definition may be obtained from the DAQ runtime using the information specified in the translated request. Specifically, the translated request contains the information necessary to find the DAQ definition in accordance with one or more embodiments of the invention.

Next, the protocol handler is triggered based on the DAQ definition (Step 345). Specifically, as previously stated, the DAQ definition identifies the protocol handlers and the mechanism for managing the asset using the protocol handlers. Based on the DAQ definition, the protocol handler is triggered with the information about the mechanism for the management. For example, suppose the DAQ definition corresponds to the runtime binding of the following NAI definition snmp://aggie@bevo:port/1.3.6.2.1.1.1.*. In such scenario, the protocol handler associated with the SNMP protocol is invoked with the information to obtain the management information from the location identified by: aggie@bevo:port/1.3.6.2.1.1.1.* in accordance with one or more embodiments of the invention.

Accordingly an asset instance is invoked using the protocol handler (Step 347). Specifically, the protocol handler uses the NAI that is identified by the NAI definition to invoke the management of the asset instance by the asset. By invoking the asset instance, the asset is managed and results may be acquired (Step 349). The results may correspond to actual management information, such as information about the asset, a success or failure indicator, a change in control (e.g., return control of operations to the DAQ without returning data), etc.

Once the results are acquired, the results are transmitted to the information model from the DAQ (Step 351). Specifically, in one or more embodiments of the invention, the information model class that called the API receives the results. Further, in the process of transmitting the results, the results may be translated using the mapping specification (Step 353). In one or more embodiments of the invention, translating the results may be performed by performing a lookup in the mapping specification for the information model class that receives the results. Accordingly, the mapping specification may also contain information that specifies the format, such as data type, transmission format, etc., for how the results are to be transmitted to the information model.

At this stage, the result may also be transmitted to the management application from the information model (Step 355). Transmitting the results from the information model format may be performed by a return statement of the information model.

As shown in FIG. 6, by using the mapping specification and the DAQ definition, the information models, protocol handlers, and assets can be easily modified without unduly affecting the system. Specifically, the information model does not have to be aware of each NAI of each asset. Accordingly, an asset can be managed by a variety of management requests without having to modify the management application or the information model.

In the following example, consider the case in which multiple instances of a new asset type called myAsset is added to the system. Because the asset type myAsset is new to the system, instrumentation definitions are added to manage myAsset in accordance with one or more embodiments of the invention. In particular, an NAI definition is defined for myAsset and linked to the required protocol handlers, information model classes are developed, and the mapping definition for myAsset is created.

When creating the mapping definition for myAsset, the mapping definition may be defined with a name, such as mappingMyAsset. Further, the mapping definition may include a list of the names of the topic tags (e.g., myAsset.system, myAsset.network, myAsset.storage, etc.) in the DAQ definition, the different methods for instrumentation and the different properties. For each method and property, the mapping specification for myAsset may specify the corresponding information model name and the DAQ definition name. Continuing with the example, the mapping specification for the information model method "reset" may specify that the corresponding DAQ definition is "system.reset." Further, the information model method "start" with argument "IMarg" maps to the DAQ definition "system.start" with DAQ argument "start.arg1." Also, the mapping specification may specify that the data type required by the different arguments.

Similar to the method mapping definition and argument mapping definition, a property mapping definition may also be included in the example mapping definition for myAsset. For example, one possible property definition is to define that the information model property name "owner" maps to the DAQ definition property name "system.administrator." Further, the information model property name "Uptime" maps to the DAQ property "system.uptime." Within the DAQ definition for the uptime property may also include the information that to translate between the two properties the resource specified by the URI "java://com.foo.time.ComputeUptime-.calculate" should be used. Once the mapping definition for the myAsset is defined and added to the mapping specification, then myAsset can be managed.

First, myAsset is enumerated in accordance with one or more embodiments of the invention. At this stage, the DAQ runtime may acquire information for each instance of myAsset. Specifically, the DAQ runtime may receive and store the location for each instance of myAsset. Next, the information is transmitted to the information model. For each instance of myAsset that exists, an information model class instance is created in the example.

Accordingly, suppose an information model class instance receives a management request to restart an instance of myAsset. Based on the management request, the information model method calls "start" with "IMarg." The call is intercepted and translated to "system.start" with argument "start.arg1" by the mapping specification. The DAQ definition for system.start is found and uses start.arg1 to start the particular instance of myAsset. Specifically, the DAQ definition identifies the exact protocol handler and method for starting the instance. When the protocol handler returns, the DAQ definition submits the results of success or failure to the mapping specification. The mapping definition for myAsset may then translate the result back to the information model class that called the method start.

As shown in the example, the mapping definition provides a bridge between the information model representation of an asset and the data acquisition that is performed.

Figure 7:
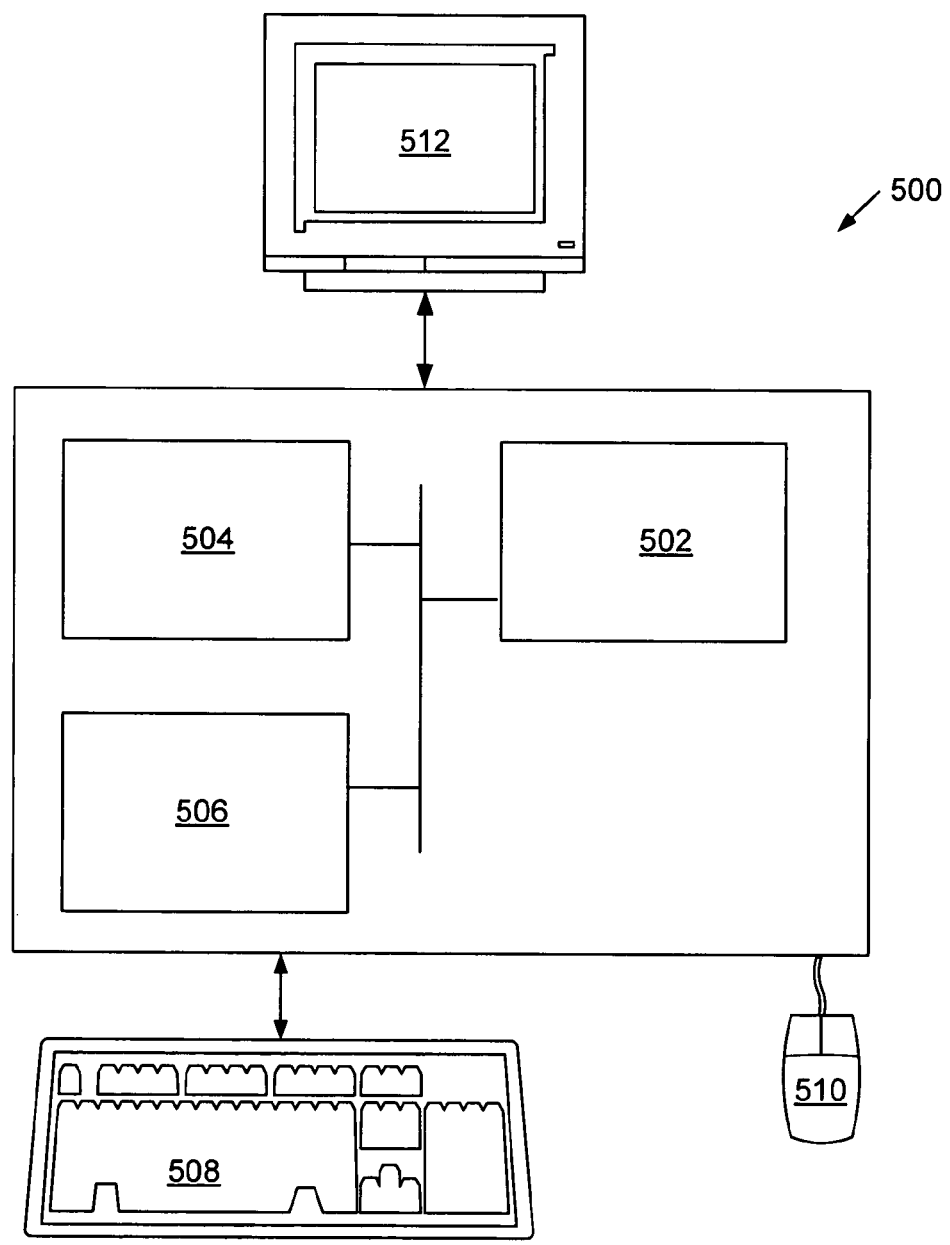
FIG. 7 shows a computer system in accordance with one or more embodiments of the invention.

The invention may be implemented on virtually any type of computer regardless of the platform being used. For example, as shown in FIG. 7, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., NAI definition, DAQ definition, Information model repository, protocol handler repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for easy management of assets. Specifically, embodiments of the invention minimize the amount of framework code required for managing an asset. More specifically, embodiments of the invention provide a link between the information model definition and the data acquisition that is performed when managing the asset. Thus, development of the information model and the data acquisition definitions may be performed in parallel. In addition multiple different information models, even written in different languages, may be used to manage the assets.

Thus, using the mapping specification, new assets of new asset type can be easily managed by only adding metadata definitions to the DAQ runtime in the form of NAI definitions. Moreover, the information model may only be adjusted to add class information for managing the new asset because the protocol information and NAI does not need to be included in accordance with one or more embodiments of the invention.

Accordingly, the mapping specification helps to reduce the framework code, thereby reducing the barrier of entry for new products to be instrumented and integrated into systems and network management framework.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing an asset comprising:
generating an information model request for managing the asset using a management application, wherein the information model request is in an information model format;
identifying a name and a type of the asset from the information model request;
identifying a mapping specification entry matching the name and the type of the asset,
wherein the mapping specification entry comprises a mapping definition for the type of the asset, and
wherein the mapping definition comprises at least one selected from a group consisting of an asset type class identifier, a tag identifier, a method mapping definition, an argument mapping definition, and a property mapping definition;
translating the information model request from the information model format to a data acquisition (DAQ) format based on the mapping specification entry to create a translated request;
identifying a DAQ definition based on the translated request, wherein the DAQ definition is in the DAQ format, wherein the DAQ definition is particular to the type of the asset, and wherein the DAQ definition comprises a DAQ method;
managing the asset using the DAQ method in the DAQ definition to obtain a result comprising management information, wherein managing the asset comprises modifying execution of the asset; and
transmitting the result to the management application,
wherein the asset is at least one selected from a group consisting of a hardware component in a computer and software executing on the computer.

2. The method of claim 1, wherein managing the asset comprises:
triggering a protocol handler according to the DAQ definition; and
managing the asset using the protocol handler.

3. The method of claim 2, wherein the DAQ definition is a runtime binding of a native asset interface definition defined in extensible markup language.

4. The method of claim 1, further comprising:
receiving the information model request from the management application;

identifying an information model class instance in the information model based on the information model request; and invoking an application programming interface (API) by the information model class instance, wherein the information model request is acquired from the API.

5. The method of claim 1, wherein the information model request results in enumerating a plurality of asset instances of the asset.

6. The method of claim 1, wherein the information model request results in obtaining a property of the asset.

7. The method of claim 1, wherein the information model request results in invoking a method on an instance of the asset.

8. The method of claim 1, wherein the information model request results in setting a property of the asset.

9. The method of claim 1, wherein the information model request results in subscribing for an event associated with the asset.

10. A system comprising:
an asset, wherein the asset is one selected from a group consisting of computer software executing on a computer and a hardware device;
a management application stored on a computer readable storage medium, which when executed by a processor is configured to:
generate an information model request for managing the asset, wherein the information model request is in an information model format; and
identify a name and a type of the asset from the information model request using an information model;
a mapping specification stored on a computer readable medium comprising:
a mapping specification entry matching the name and the type of the asset,
wherein the mapping specification entry comprises a mapping definition for the type of the asset,
wherein the mapping definition comprises at least one selected from a group consisting of an asset type class identifier, a tag identifier, a method mapping definition, an argument mapping definition, and a property mapping definition, and
wherein the management application is further configured to:
translate the information model request from the information model format to a data acquisition (DAQ) format based on the mapping specification entry to create a translated request; and
a DAQ runtime configured to:
identify a DAQ definition based on the translated request, wherein the DAQ definition is in the DAQ format, wherein the DAQ definition is particular to the type of the asset, and wherein the DAQ definition comprises a DAQ method; and
manage the asset using the DAQ method in the DAQ definition to obtain a result comprising management information, wherein managing the asset comprises modifying execution of the asset,
wherein the result is transmitted to the management application.

11. The system of claim 10, wherein managing the asset comprises:
triggering a protocol handler according to the DAQ definition; and
managing the asset using the protocol handler.

12. The system of claim 11, wherein the DAQ definition is a runtime binding of a native asset interface definition defined in extensible markup language.

13. The system of claim 10, further comprising:
an information model runtime configured to:
receive the information model request from the management application;
identify an information model class instance in an information model based on the information model request; and
invoke an API by the information model class instance, wherein the information model request is acquired from the API.

14. The system of claim 10, wherein the information model request results in enumerating a plurality of asset instances of the asset.

15. The system of claim 10, wherein the information model request results in obtaining a property of the asset.

16. The system of claim 10, wherein the information model request results in invoking a system on an instance of the asset.

17. The system of claim 10, wherein the information model request results in setting a property of the asset.

18. The system of claim 10, wherein the information model request results in subscribing for an event associated with the asset.

19. A distributed computer system having a plurality of nodes, wherein each node comprises a processor, and wherein each node is configured to perform a method comprising:
generating an information model request for managing an asset using a management application, wherein the information model request is in an information model format, and wherein the management application is stored on a computer readable storage medium;
identifying a name and a type of an asset from the information model request;
identifying a mapping specification entry matching the name and the type of the asset,
wherein the mapping specification entry comprises a mapping definition for the type of the asset, and
wherein the mapping definition comprises at least one selected from a group consisting of an asset type class identifier, a tag identifier, a method mapping definition, an argument mapping definition, and a property mapping definition;
translating the information model request from the information model format to a DAQ format based on the mapping specification entry to create a translated request;
identifying a DAQ definition based on the translated request, wherein the DAQ definition is in the DAQ format, wherein the DAQ definition is particular to the type of the asset, and wherein the DAQ definition comprises a DAQ method;
managing the asset using the DAQ method in the DAQ definition to obtain a result comprising management information, wherein managing the asset comprises modifying execution of the asset; and
transmitting the result to the management application,
wherein obtaining the mapping specification entry and managing the asset is performed on at least one of the plurality of nodes, and
wherein the asset is at least one selected from a group consisting of a hardware component in a computer and software executing on the computer.

20. The distributed computing system of claim 19, wherein managing the asset comprises:
triggering a protocol handler according to the DAQ definition; and
managing the asset using the protocol handler.

* * * * *